United States Patent
Owen et al.

(10) Patent No.: US 10,421,442 B2
(45) Date of Patent: Sep. 24, 2019

(54) MANAGING VEHICLE DECELERATION

(71) Applicant: Jaguar Land Rover Limited, Whitley, Coventry, Warwickshire (GB)

(72) Inventors: Simon Owen, Redditch (GB); Karl Richards, Leamington Spa (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 189 days.

(21) Appl. No.: 15/506,724

(22) PCT Filed: Jul. 22, 2015

(86) PCT No.: PCT/EP2015/066740
§ 371 (c)(1),
(2) Date: Feb. 24, 2017

(87) PCT Pub. No.: WO2016/030088
PCT Pub. Date: Mar. 3, 2016

(65) Prior Publication Data
US 2018/0222460 A1    Aug. 9, 2018

(30) Foreign Application Priority Data
Aug. 26, 2014    (GB) .................................. 14150486

(51) Int. Cl.
*B60T 8/1761*    (2006.01)
*B60T 8/00*    (2006.01)
(Continued)

(52) U.S. Cl.
CPC .............. *B60T 8/1761* (2013.01); *B60T 8/00* (2013.01); *B60T 8/3275* (2013.01);
(Continued)

(58) Field of Classification Search
CPC ........ B60T 8/1761; B60T 8/00; B60T 8/3275; B60T 2210/16; B60T 2230/04; B60T 2270/303; B60W 10/188; B60W 30/18109; B60W 2510/182; B60W 2520/105

USPC .......................................................... 701/79
See application file for complete search history.

(56) References Cited

U.S. PATENT DOCUMENTS 6,332,354 B1 * 12/2001 Lalor ....................... B60T 8/00
                                                          701/70
2005/0216164 A1 * 9/2005 Sakata .................. B60T 8/1755
                                                          701/70
(Continued)

FOREIGN PATENT DOCUMENTS

EP        0823360 A2    2/1998
JP        2008126859 A  6/2008

OTHER PUBLICATIONS

Combined Search and Examination Report for application No. GB1415048.6, dated Feb. 23, 2015, 5 pages.
(Continued)

*Primary Examiner* — Aaron L Troost
*Assistant Examiner* — Paula L Schneider
(74) *Attorney, Agent, or Firm* — Reising Ethington P.C.

(57) ABSTRACT

A method of managing the deceleration of a vehicle. The method comprises receiving a brake command and determining an actual rate of deceleration of the vehicle. The method further comprises monitoring the speed of the vehicle as the vehicle decelerates in response to the brake command. The method still further comprises modifying the amount of brake torque being applied to one or more wheels of the vehicle when the vehicle speed reaches a predetermined threshold, by first decreasing the amount of brake torque being applied and then subsequently increasing the amount of brake torque being applied to bring the vehicle to a standstill. A system for implementing the methodology is also provided.

19 Claims, 9 Drawing Sheets

(51) Int. Cl.
*B60T 8/32* (2006.01)
*B60W 10/188* (2012.01)
*B60W 30/18* (2012.01)

(52) U.S. Cl.
CPC .... *B60W 10/188* (2013.01); *B60W 30/18109* (2013.01); *B60T 2210/16* (2013.01); *B60T 2230/04* (2013.01); *B60T 2270/303* (2013.01); *B60W 2510/182* (2013.01); *B60W 2520/105* (2013.01)

(56) References Cited

U.S. PATENT DOCUMENTS

| | | | | |
|---|---|---|---|---|
| 2007/0182243 | A1* | 8/2007 | Osborn | B60T 7/22 303/10 |
| 2010/0286882 | A1* | 11/2010 | Sin | B60T 7/042 701/70 |
| 2012/0083981 | A1* | 4/2012 | Nihei | B60T 8/1755 701/69 |
| 2014/0257603 | A1* | 9/2014 | McKeown | B64D 45/00 701/16 |

OTHER PUBLICATIONS

International Search Report for International application No. PCT/EP2015/066740, dated Sep. 25, 2015, 5 pages.
Written Opinion for International application No. PCT/EP2015/066740, dated Sep. 25, 2015, 7 pages.

\* cited by examiner

MANAGING VEHICLE DECELERATION

TECHNICAL FIELD

The present disclosure relates to automatic speed control of a vehicle and particularly, but not exclusively, to automatically managing the deceleration of a vehicle. Aspects of the invention relate to a method, to a non-transitory computer-readable storage medium, to a system, to a vehicle, and to an electronic controller.

BACKGROUND

As a vehicle decelerates to a stop whilst traversing terrain having a deformable, low-mu surface (e.g., sand, gravel, mud, or wet grass,) the wheels of the vehicle may dig or sink into the soft surface of the terrain. The digging or sinking of the vehicle wheels may be compounded or made worse by the pitching of the vehicle—and therefore, the transfer of the vehicle weight—toward the front wheels of the vehicle as the vehicle decelerates (i.e., a greater vertical force is applied to the front wheels of the vehicle). The extent to which the wheels dig/sink into the surface may be dependent upon a number of factors, such as, for example, the speed of the vehicle, the gradient (i.e., incline) of the terrain the vehicle is traversing, the weight of the vehicle, the size (e.g., footprint) and/or pressure of the tyres, and the demanded brake torque, to cite a few possibilities. For example, when a relatively high demanded brake torque is applied the vehicle wheels, for example a demanded brake torque typically used to decelerate a vehicle on a high-mu surface (e.g., tarmac or pavement), the vehicle wheels may dig/sink relatively deeply into the surface, for example in very soft surfaces such as dry sand the wheels may dig in up to the rims on which the vehicle's tires are mounted, or more.

As the vehicle wheels dig/sink into the surface, a drag torque may be applied to the wheels that has a decelerating effect on the vehicle. The combination of the demanded brake torque and the decelerating drag torque caused by the digging/sinking of the wheels may cause the vehicle to decelerate and, in certain instances, abruptly stop in an uncomposed manner.

Additionally, as the vehicle wheels dig/sink into the surface, a substantial amount of surface material (e.g., sand, gravel, mud, etc) may build-up in front of the vehicle wheels. This build-up of material may make it more difficult to subsequently pull away in a composed manner since the vehicle must first overcome the build-up of material before progressing as desired.

Accordingly, it is an aim of the present invention to address, for example, the disadvantages identified above.

SUMMARY OF THE INVENTION

According to one aspect of the invention for which protection is sought, there is provided a method of managing the deceleration of a vehicle. In an embodiment, the method comprises: receiving a brake command; determining an actual rate of deceleration of the vehicle; monitoring the speed of the vehicle as the vehicle decelerates in response to the brake command; and when the vehicle speed reaches a predetermined threshold, automatically modifying the amount of brake torque being applied to one or more wheels of the vehicle by first decreasing the amount of brake torque being applied and then subsequently increasing the amount of brake torque being applied to bring the vehicle to a standstill.

According to another aspect of the invention for which protection is sought, there is provided a system for managing the deceleration of a vehicle. In an embodiment, the system comprises: means for receiving a brake command; means for monitoring the speed of the vehicle as the vehicle decelerates in response to the brake command; and means for automatically commanding the modification of the amount of brake torque being applied to one or more wheels of the vehicle when the speed of the vehicle reaches a predetermined threshold, by first commanding a decrease in the amount of brake torque being applied and then subsequently commanding an increase in the amount of brake torque being applied to bring the vehicle to a stop. In an embodiment, the system comprises an electronic processor having an electrical input for receiving the brake command, and an electronic memory device electrically coupled to the electronic processor and having instructions stored therein, wherein the processor is configured to access the memory device and execute the instructions stored therein such that it is operable to: monitor the speed of the vehicle as the vehicle decelerates, and when the vehicle speed reaches the predetermined threshold, automatically command the modification of the brake torque being applied by first commanding a decrease in the applied brake torque and then subsequently commanding an increase in the brake torque being applied.

According to a still further aspect of the invention for which protection is sought, there is provided an electronic controller for a vehicle having a storage medium associated therewith storing instructions that when executed by the controller cause the automatic speed control of a vehicle in accordance with the method of: receiving a brake command; monitoring the speed of the vehicle as the vehicle decelerates in response to the brake command; and when the vehicle speed reaches a predetermined threshold, automatically modifying the amount of brake torque being applied to one or more wheels of the vehicle by first decreasing the amount of brake torque being applied and then subsequently increasing the amount of brake torque being applied to bring the vehicle to a standstill.

According to yet another aspect of the invention for which protection is sought, there is provided a vehicle comprising the system described herein.

According to a further aspect of the invention for which protection is sought, there is provided a non-transitory, computer-readable storage medium storing instructions thereon that when executed by one or more electronic processors causes the one or more processors to carry out the method described herein.

Optional features of the various aspects of the invention are set out below in the dependent claims.

At least some embodiments or implementations of the present invention have the advantage that when a vehicle traversing a deformable, low-mu surface (e.g., sand, gravel, wet grass, or mud) is being decelerated to a stop, brake torque applied to one or more wheels of the vehicle is automatically reduced to account for and effectively cancel out a drag torque applied to the vehicle wheels by the low-mu surface that has a decelerating effect on the vehicle. By accounting for the drag torque in this manner, the depth to which the vehicle wheels sink or dig into the surface is at least limited, and therefore, the abruptness with which the vehicle comes to a stop may also be limited. The build-up of material in front of the wheels as the vehicle comes to a stop may also be eliminated (or at least limited); and to the extent there is a material build-up, the wheels of the vehicle may be allowed to roll over the build-up at the end of the stop before coming to a standstill on top of the surface. As a result, it may be easier for the vehicle to subsequently pull away in a composed and expected manner.

Within the scope of this application it is expressly intended that the various aspects, embodiments, examples, and alternatives set out in the preceding paragraphs, in the claims, and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that matter.

BRIEF DESCRIPTION OF THE DRAWINGS

One or more embodiments of the invention will now be described, by way of example only, with reference to the following figures in which.

DETAILED DESCRIPTION

The system and method described herein may be used to automatically control the deceleration of a vehicle. In an embodiment, the present system and method receive a brake command, monitor the speed of the vehicle as the vehicle decelerates in response to the brake command, and when the vehicle speed reaches a predetermined threshold, modify the amount of brake torque being applied to one or more wheels of the vehicle by first decreasing the amount of brake torque being applied and then subsequently increasing the amount of brake torque being applied to bring the vehicle to a standstill.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present invention.

Figure 1:
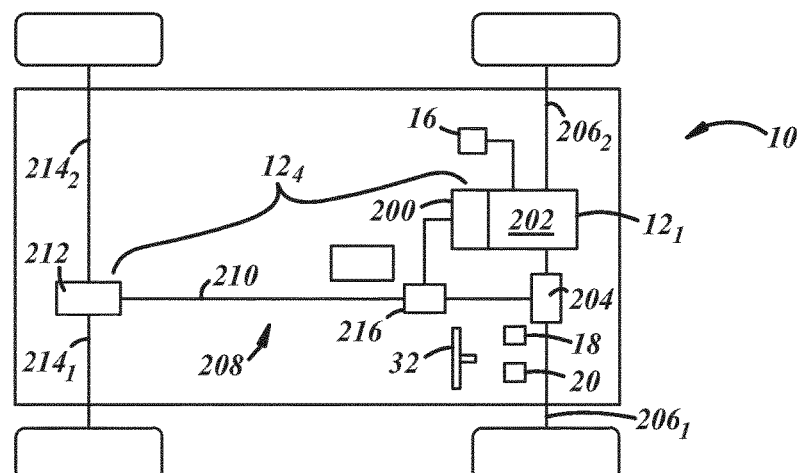
FIG. 1 is a schematic and block diagram of a vehicle.
Figure 2:
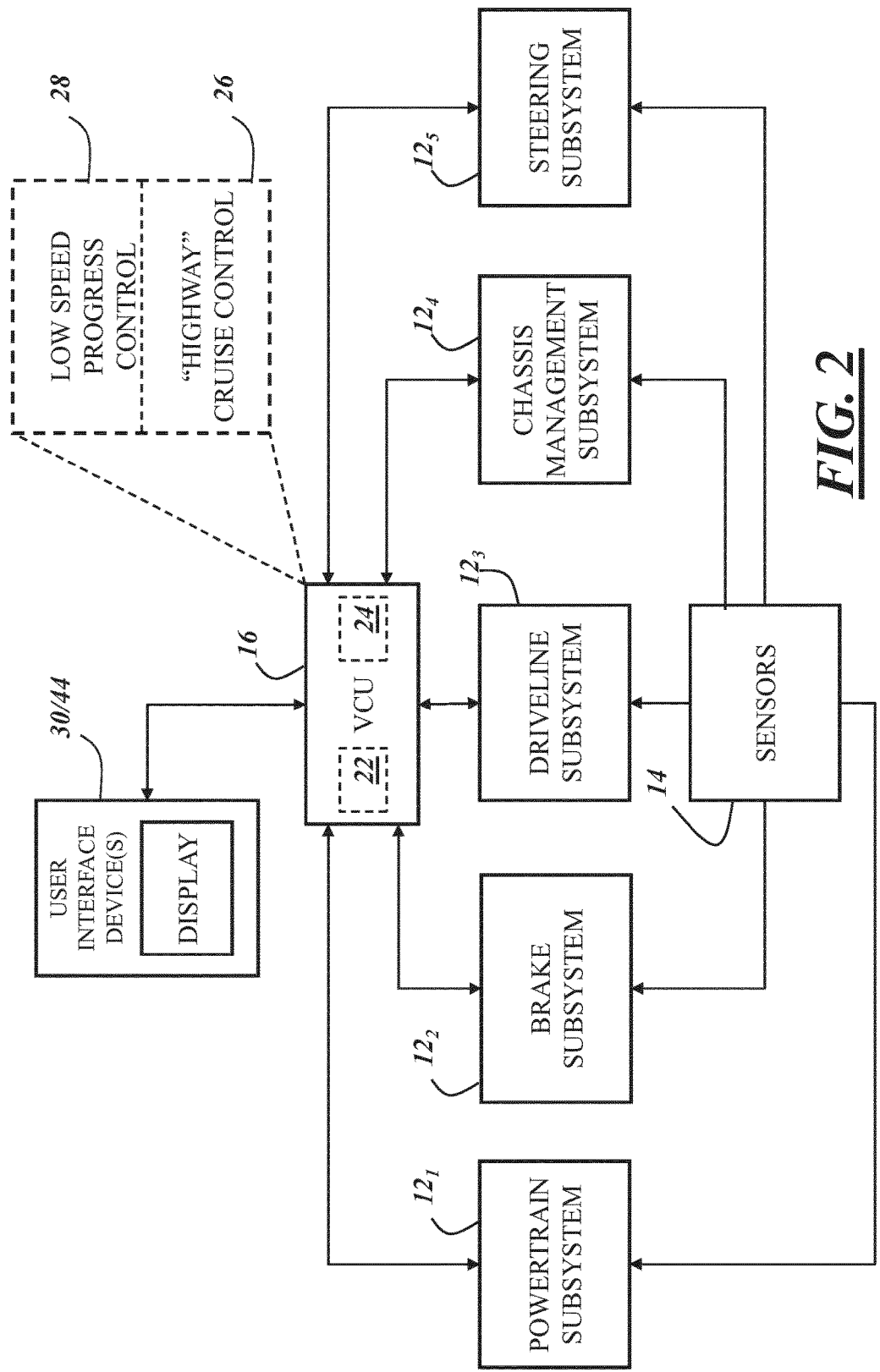
FIG. 2 is another block diagram of the vehicle illustrated in FIG. 1.

With reference to FIGS. 1 and 2, there are shown some of the components of a vehicle 10 with which the present system and method may be used. Although the following description is provided in the context of the particular vehicle illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to an embodiment, vehicle 10 generally includes a plurality of vehicle systems or subsystems 12, a plurality of vehicle sensors 14, and a vehicle control means in the form of an electronic controller 16 (which, in a non-limiting embodiment such as that described below, comprises a vehicle control unit (VCU) (i.e., VCU 16)), among any number of other components, systems, and/or devices that may or may not be illustrated or otherwise described herein.

Subsystems 12 of vehicle 10 may be configured to perform or control various functions and operations relating to the vehicle and, as illustrated in FIG. 2, may include any number of subsystems, for example, a powertrain subsystem $12_1$, a brake subsystem $12_2$, and a driveline subsystem $12_3$.

As is well known in the art, powertrain subsystem $12_1$ is configured to generate power or torque (also referred to below as "drive torque") that is used to propel the vehicle. The amount of torque generated by the powertrain subsystem may be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In an embodiment, however, the maximum output capacity of powertrain subsystem $12_1$ of vehicle 10 may be in the order of 600 Nm. As is known in the art, powertrain output torque may be measured using one or more of vehicle sensors 14 described below (e.g., an engine torque sensor, a driveline torque sensor, etc.) or other suitable sensing means, and may be used for a variety of purposes by one or more components, modules, or subsystems of vehicle 10 in addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, such as, for example, output torque sensors, electronic control units, and/or any other suitable components known in the art. For instance, in an embodiment, powertrain subsystem $12_1$ may include one or more electric machines, for example, one or more electric machines operable as electrical generators, that are configured to apply retarding torque and/or drive torque to a portion of the powertrain subsystem and/or one or more wheels of the vehicle so as to cause the vehicle to decelerate with or without the use of the brake subsystem (e.g., frictional braking) or to propel the vehicle, respectively. Accordingly, the present invention is not limited to any one particular powertrain subsystem.

Brake subsystem $12_2$ is configured to generate brake torque (also referred to as "negative torque") that is used to slow the vehicle. The application of a sufficient amount of brake torque to the wheel(s) of vehicle 10 results in the slowing down and/or stopping of the progress of vehicle 10.

Brake subsystem $12_2$ may take any number of forms known in the art, including, but certainly not limited to, one or a combination of electro-hydraulic, electro-mechanical, regenerative, and brake-by-wire systems.

In an embodiment, brake subsystem $12_2$ is a hydraulic-based brake system. As will be appreciated by one having ordinary skill in the art, the brake subsystem $12_2$ may include a brake pedal (pedal 18 shown in FIG. 1), an actuating rod, a master cylinder assembly, one or more brake or hydraulic lines, and one or more brake caliper assemblies (e.g., one for each wheel of vehicle 10), which, in turn, may include, for example, one or more caliper pistons, brake pads, and a brake disc (also called a rotor) that is coupled to an axle of vehicle 10. The operation of such a system is well known; however, for purposes of illustration, a brief summary will be provided. When pedal 18 is pressed to initiate a driver-demanded braking event, the actuating rod, which is coupled to pedal 18, applies a force onto a piston in the master cylinder that, in turn, causes fluid from a brake fluid reservoir to flow into the master cylinder. This results in an increase in fluid pressure in the brake system (i.e., also referred to as "brake pressure") and results in brake or hydraulic fluid being forced through the hydraulic lines toward one or more of the caliper assemblies. When the fluid reaches a caliper assembly, the piston(s) thereof apply a force to the brake pad and pushes the pad against the brake disc. Friction between the pad and the brake disc results in the generation of a brake torque that is applied to the axle to which the brake disc is coupled, thereby causing the vehicle to decelerate. In any event, it will be appreciated that while a description of one particular example of a brake subsystem has been provided, the present invention is not intended to be limited to any one particular type of brake subsystem. For example, in an instance wherein the vehicle 10 is a hybrid or electrical vehicle the brake subsystem $12_2$ may additionally or alternatively include one or more regenerative braking devices configured to apply negative or brake torque to one or more wheels (or corresponding axles) of the vehicle 10.

As will be described in greater detail below, in an embodiment, though certainly not the only embodiment, brake subsystem $12_2$ may further include a controller or electronic control unit (ECU) that is configured and operable to perform, or to contribute to the performance of, various functions. For example, in an embodiment, brake subsystem $12_2$ may include a dedicated brake controller (commonly referred to as an anti-lock brake system (ABS) controller) that is able to individually and separately control the brake torque applied to each wheel of vehicle 10, as well as to perform or control the performance of some or all of the steps of the methodology described below. Alternatively, some or all of this functionality may be performed by one or more other components of vehicle 10 in conjunction with brake subsystem $12_2$.

As illustrated in FIG. 1, driveline subsystem $12_3$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_3$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_3$ may be arranged to drive only the front wheels or the rear wheels, or selectable two wheel drive/four wheel drive vehicles.

In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer unit 216 may be configured to operate in either a high range (HI) or low range (LO) gear ratio, which may be adjustable by driveline subsystem $12_3$ itself and/or by another component of vehicle 10, such as, for example, VCU 16. Those having ordinary skill in the art will appreciate that driveline subsystem $12_3$ may be provided according to any number of different embodiments, implementations, or configurations, may be connected in any number of different configurations, and may include any number of different components, like sensors (e.g., HI/LO ratio sensor, transmission gear ratio sensors, etc.), control units, and/or any other suitable components known in the art. Accordingly, the present invention is not intended to be limited to any one particular driveline subsystem.

In addition to those subsystems described above, vehicle 10 may further comprise any number of other or additional subsystems. For example, and as illustrated in FIG. 2, vehicle 10 may include a chassis management or control subsystem $12_4$ and/or a steering subsystem $12_5$, to cite a few possibilities. For the purposes of this invention, each of the aforementioned subsystems 12 and the functionality corresponding thereto is conventional in the art. As such, detailed descriptions will not be provided; rather, the structure and function of each identified subsystem 12 will be readily apparent to those having ordinary skill in the art.

In an embodiment, one or more of subsystems 12 may be under at least a certain degree of control by VCU 16 (a detailed description of which will be provided below). In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem $12_1$ as an example, powertrain subsystem $12_1$ may be configured to gather various types of information relating to certain vehicle operating parameters, such as, for example, torque output, engine or motor speed, etc., and to communicate that information to VCU 16. This information may be gathered from, for example, one or more of vehicle sensors 14 described below. Powertrain subsystem $12_1$ may also receive commands from VCU 16 to adjust certain operating parameters when, for example, a change in conditions dictates such a change (e.g., when a change in vehicle speed has been requested via a brake pedal (pedal 18 in FIG. 1) or an accelerator pedal (pedal 20 in FIG. 1) of vehicle 10). While the description above has been with particular reference to powertrain subsystem $12_1$, it will be appreciated that the same principle applies to each such other subsystem 12 that is configured to exchange information/commands with VCU 16 or directly with one another.

In an embodiment, each subsystem 12 may include a dedicated control means in the form of one or more controllers (e.g., one or more electronic control units (ECUs)) configured to receive and execute instructions or commands provided by VCU 16, and/or to perform or control certain functionality (e.g., that of the methodology described below) independent from VCU 16. In such an embodiment, each controller may comprise any suitable ECU, and may include any variety of electronic processing devices, memory devices, input/output (I/O) devices, and/or other known components, and perform various control and/or communication related functions. In an embodiment, each controller may include an electronic memory device that may store various information, instructions, sensor readings (e.g., such as those generated by vehicle sensors 14), look-up tables, profiles, or other data structures (e.g., such as those used in the performance of the method described below), algorithms (e.g., the algorithms embodied in the method described below), etc. The memory device may comprise a carrier medium carrying a computer-readable code for controlling one or more components of vehicle 10 to carry out the method(s) described below. Each controller may also include one or more electronic processing devices (e.g., a microprocessor, a microcontroller, an application specific integrated circuit (ASIC), etc.) that executes instructions for software, firmware, programs, algorithms, scripts, applications, etc. that are stored in the corresponding memory device and may govern the methods described herein. Each controller may also be electronically connected to other vehicle devices, modules, subsystems, and components (e.g., sensors) via suitable vehicle communications and can interact with them when or as required.

Alternatively, two or more subsystems 12 may share a single control means in the form of one or more controllers, or one or more subsystems 12 may be directly controlled by the VCU 16 itself. In an embodiment wherein a subsystem 12 communicates with VCU 16 and/or other subsystems 12, such communication may be facilitated via any suitable wired or wireless connection, such as, for example, a controller area network (CAN) bus, a system management bus (SMBus), a proprietary communication link, or through some other arrangement known in the art.

For purposes of this disclosure, and notwithstanding the above, it is to be understood that the controller(s) or ECU(s) described herein may each comprise a control unit or computational device having one or more electronic processors. Vehicle 10 and/or a subsystem 12 thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present invention.

Vehicle sensors 14 may comprise any number of different sensors, components, devices, modules, systems, etc. In an embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to vehicle 10 and the operation and configuration thereof, and may include, for example and without limitation, any one or more of: wheel speed sensor(s); ambient temperature sensor(s); atmospheric pressure sensor(s); tyre pressure sensor(s); gyro sensor(s) to detect yaw, roll, and pitch of the vehicle; vehicle speed sensor(s); longitudinal acceleration sensor(s); engine torque sensor(s); driveline torque sensor(s); throttle valve sensor(s); steering angle sensor(s); steering wheel speed sensor(s); gradient sensor(s); lateral acceleration sensor(s); brake pedal position sensor(s); brake pedal pressure sensor(s); brake pressure sensor(s); accelerator pedal position sensor(s); air suspension sensor(s) (i.e., ride height sensors); wheel position sensor(s); wheel articulation sensor(s); vehicle body vibration sensor(s); water detection sensor(s) (for both proximity and depth of wading events); transfer case HI-LO ratio sensor(s); air intake path sensor(s); vehicle occupancy sensor(s); and longitudinal, lateral, and vertical motion sensor(s), among others known in the art.

The sensors identified above, as well as any other sensors not specifically identified above but that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 or a subsystem 12 may receive certain information from the ECU of a (another) subsystem 12 rather than directly from a sensor 14. It should be appreciated that the foregoing scenarios represent only some of the possibilities, as vehicle 10 is not limited to any particular sensor(s) or sensor arrangement(s); rather any suitable embodiment may be used.

In an embodiment, VCU 16 may comprise any suitable ECU, and may include any variety of electronic processing devices, memory devices, input/output (I/O) devices, and/or other known components, and perform various control and/or communication related functions. In an embodiment, VCU 16 includes an electronic memory device 22 that may store various information, sensor readings (e.g., such as those generated by vehicle sensors 14), look-up tables or other data structures (e.g., such as those used in the performance of the method described below), algorithms (e.g., the algorithms embodied in the method described below), etc. Memory device 22 may comprise a carrier medium carrying a computer-readable code for controlling one or more components of vehicle 10 to carry out the method(s) described below. Memory device 22 may also store pertinent characteristics and background information pertaining to vehicle 10 and subsystems 12. VCU 16 may also include one or more electronic processing devices 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when or as required. In addition to the functionality that may be performed by VCU 16 described elsewhere herein, in an embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments, implementations, or configurations could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in an embodiment, vehicle 10 may further comprise one or more automatic vehicle speed control systems. For example and with continued reference to FIG. 2, in an embodiment, vehicle 10 may further comprise a cruise control system 26, also referred to as an "on-highway" or "on-road" cruise control system, and a low-speed progress (LSP) control system 28, which may be referred to an "off-highway" or "off-road" progress control system.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem $12_1$), or for example, VCU 16 (as is illustrated in FIG. 2).

Figure 3:
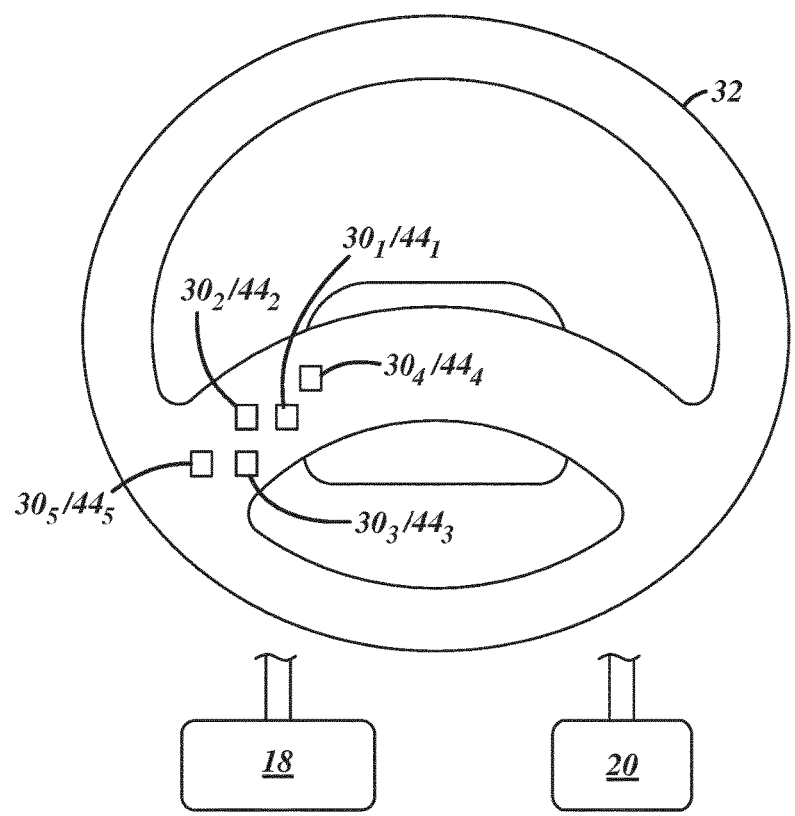
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, center console, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button $30_1$ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button $30_2$ may be provided to allow the user to increase the set-speed in discrete increments (e.g., 1 mph (or 1 kph)), and a "−" button $30_3$ to allow the user to decrease the set-speed in the same or different discrete increments. Alternatively, the "+" and "−" buttons $30_2$, $30_3$ may be integrated into a single user-selectable device. Additional user-selectable interface devices of system 26 may include, for example, a "cancel" button $30_4$ to deactivate the system, as well as a "resume" button $30_5$ to allow for the system to be re-activated following a temporary suspension of the system function, for example standard cruise control system go into a standby state where they do not control vehicle speed if the user brakes as detailed further below.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without, for example, any pedal inputs being required by the user. This low-speed progress control function differs from that of cruise control system 26 in that unlike cruise control system 26, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user presses or depresses the brake or the clutch pedals, for example, the on-road cruise control function is suspended and the vehicle reverts to a manual mode of operation requiring user pedal input to maintain vehicle speed and a dedicated operator input (e.g., a "resume" button) is needed to reactivate the cruise control in an active mode in which it controls vehicle speed. In addition, in at least certain cruise control systems, the detection of a wheel slip event, which may be initiated by a loss of traction, may also have the effect of cancelling the cruise control function. LSP control system 28 may also differ from such cruise control systems in that, in at least an embodiment, it is configured in such a way that the speed control function provided thereby may not be cancelled or deactivated in response to those events described above. In an embodiment, LSP control system 28 is particularly suited for use in off-road or off-highway driving.

In an embodiment, LSP control system 28 includes, among potentially other components, a control means in the form of a controller 42, which, in an embodiment such as that described below, comprises an ECU (i.e., ECU 42) (shown, in the illustrated embodiment and for reasons described below, as comprising VCU 16), and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: detecting brake and brake release commands initiated by a user or vehicle occupant; automatically commanding and controlling a drive torque generated by the powertrain subsystem $12_1$ and/or a retarding torque generated and applied to one or more wheels of vehicle 10 by, for example, brake subsystem $12_3$; determining the type and/or one or more characteristics of the terrain over which vehicle 10 is traveling; etc. Further, in an embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up tables or other data structures, algorithms, software, acceleration/deceleration profile(s), and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, identify the particular type of terrain vehicle 10 is traversing, and otherwise interact with system 28 as may be described below. These user interface devices may also allow for system 28 to provide certain notifications, alerts, messages, requests, etc. to the user including, but not limited to, those described herein below. Each of these devices may take any number of forms, such as, for example and without limitation, one or more of: a pushbutton; a switch; a touch screen; a visual display; a speaker; a heads-up display; a keypad; a keyboard; a selector knob or dial; or any other suitable device. Additionally, these devices may be located at any number of locations within the vehicle cabin and in relatively close proximity to the user (e.g., steering wheel, steering column, dashboard, etc.). In an embodiment, user interface devices 30, 44 of on-highway cruise control system 26 and LSP control system 28, respectively, are arranged adjacent to one another within vehicle 10, and, in an embodiment, on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

In addition to performing a speed control function, LSP control system 28 may be further configured to detect, sense, derive, or otherwise determine information relating to the terrain over which vehicle 10 is traveling (e.g., terrain type, surface type, terrain classification, terrain or surface roughness, etc.). In accordance with an embodiment, VCU 16 may be configured to perform this function and to do so in a number of ways. One such way is that described in UK Published Application No. GB2492748A published on 16 Jan. 2013, the entire contents of which are incorporated herein by reference. More particularly, in an embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the classification, roughness, etc. of the terrain.

More specifically, in an embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll.

Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is traveling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude vertical wheel excitement indicative of a washboard type surface). The SCS activity signal is derived from several outputs from the ECU of a stability control system (SCS), which may contain a dynamic stability control (DSC) function, a terrain control (TC) function, anti-lock braking system (ABS), and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In an embodiment, and in addition to the estimator module, a road roughness module may also be included for calculating the terrain roughness based on air suspension sensors (the ride height or suspension articulation sensors) and wheel accelerometers. In such an embodiment, a terrain indicator signal in the form of a roughness output signal is output from the road roughness module.

In any event, the estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes (e.g., terrain modes) is most appropriate based on the indicators of the type of terrain over which the vehicle is traveling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), one of subsystems 12, or another suitable component may be appropriately configured to do so, and such other embodiments remain within the spirit and scope of the present invention.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any particular embodiments or arrangements.

Again, the preceding description of vehicle 10 and the illustrations in FIGS. 1 and 2 are only intended to illustrate one potential vehicle arrangement and to do so in a general way. Any number of other vehicle arrangements and architectures, including those that differ significantly from the one shown in FIGS. 1 and 2, may be used instead.

Figure 4A:
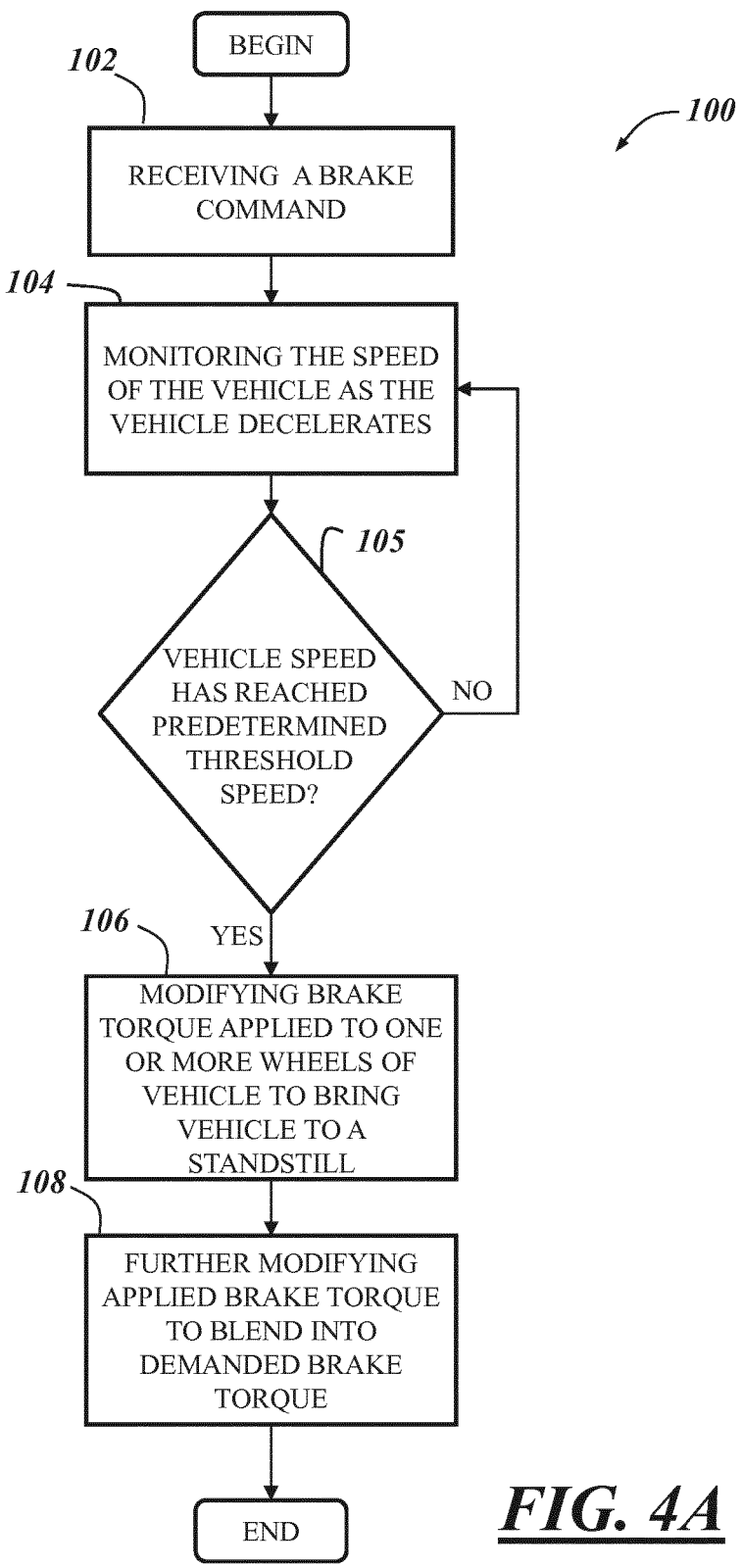
FIGS. 4A-4D are flow diagrams depicting various steps of embodiments of a method of managing the deceleration of a vehicle as the vehicle decelerates.

Turning now to FIG. 4A, there is shown an example of a method 100 of managing the deceleration of a vehicle as the vehicle is decelerated. For purposes of illustration and clarity, method 100 will be described in the context of vehicle 10 described above and illustrated in FIGS. 1 and 2, and brake subsystem $12_2$ thereof in particular. It will be appreciated however, that the application of the present methodology is not meant to be limited solely to such an arrangement, but rather method 100 may find application with any number of arrangements (i.e., the steps of method 100 may be performed by subsystems or components of vehicle 10 other than those described below, or vehicle arrangements other than that described above). Additionally, it will be appreciated that unless otherwise noted, the performance of method 100 is not meant to be limited to any one particular order or sequence of steps or to any particular component(s) for performing the steps.

In an embodiment, method 100 comprises a step 102 of receiving a brake command, which may comprise a user or driver-initiated brake command (e.g., initiated via the brake pedal 18 of the vehicle 10) or a system or vehicle-initiated brake command (e.g., initiated via a speed control system (e.g., the LSP control system 28) of the vehicle 10). This step may be performed in any number of ways. In one non-limiting example, step 102 comprises receiving an electrical signal that is indicative of a demanded brake torque, which, in an embodiment, may comprise a signal indicative of a demanded brake pressure to be generated in the vehicle brake subsystem $12_2$. The electrical signal may be received from a number of sources, such as, for example and without limitation, one or more sensors 14 of the vehicle (e.g., a brake pedal sensor, a brake pressure sensor, etc.) or from another system or component of the vehicle 10 (e.g., a subsystem 12, LSP control system 28, etc.) that is configured to determine or derive the demanded brake torque or brake pressure. Further, the signal may be received directly from the source or indirectly therefrom via, for example, a CAN bus, a SMBus, a proprietary communication link or in another suitable manner. It will be appreciated that the present invention is not intended to be limited to any particular way of performing step 102. For example, in embodiments other than that or those described above, step 102 may comprise receiving one or more electrical signals that is/are indicative of vehicle-related parameters other than brake torque or brake pressure, but that may be used to determine or derive values of one or both of a demanded brake torque or pressure, or that may be otherwise used in the performance of method 100. Such embodiments remain within the spirit and scope of the present invention.

The above described functionality of step 102 may be performed by any suitable means, for example, an electronic processor that includes an electrical input for receiving a brake command in the form of electrical signals, including, for example, those described above. In an embodiment, the electronic processor may comprise and electronic processor of brake subsystem $12_2$ (e.g., ABS controller) or another suitable component of vehicle 10.

Following the receipt of the brake command in step 102, method 100 may move to a step 104 of monitoring the speed of the vehicle as the vehicle decelerates in response to the brake command. The vehicle speed may be monitored using, for example, readings from one or more of the vehicle sensors 14 (e.g., wheels speed sensor(s), vehicle speed sensor(s), etc.) or vehicle subsystems (e.g., powertrain subsystem $12_1$). Accordingly, in an embodiment, one or more electrical signals indicative of a value of the vehicle speed (or of a vehicle-related parameter that may be used to derive the vehicle speed) may be received from one or more sensors 14 and/or subsystems 12 and interpreted to determine the speed of the vehicle 10. These electrical signal(s) may be received directly from the pertinent sensor(s) and/or subsystem(s) or indirectly therefrom via, for example, a CAN bus, SMBus, proprietary communication link, or in some other suitable manner. This process may then be repeated in accordance with a predetermined sampling rate, which may be any suitable increment or interval of time, to continuously monitor the vehicle speed as the vehicle decelerates.

Each time a value of the vehicle speed is determined in step 104, it may be evaluated in a step 105 to determine whether the vehicle speed has reached a predetermined threshold speed. The predetermined threshold speed may be indicative that the vehicle is about to come to a standstill. This may be accomplished by, for example, comparing the actual vehicle speed with the threshold, or the vehicle speed falling below a lowest measurable wheel speed. In an embodiment, the threshold may correspond to the lowest speed that the component(s) performing step 104 is able to accurately measure, which, in some implementations, may be on the order of 2 kph (i.e., around 1 mph); though other threshold speeds may certainly be used, for example, in an embodiment the threshold speed is less than 5 kph, or less than 2 kph. In any event, if it is determined in step 105 that the vehicle speed has not reached the threshold speed (i.e., the vehicle speed exceeds or is above the threshold), method 100 may loop back to step 104 and the vehicle speed may continue to be monitored. If, however, the vehicle speed has reached the threshold speed (i.e., either meets or falls below the threshold), method 100 may move on to step 106 described below.

In an embodiment, the functionality of steps 104, 105 may be performed by any suitable means, for example, an electronic processor that includes one or more electrical inputs for receiving electrical signals, including, for example, those described above, and that is configured to access a memory device and execute the instructions stored therein such that it is operable to perform the required functionality. In an embodiment, the electronic processor may comprise an electronic processor of brake subsystem $12_2$ (e.g., ABS controller) or another suitable component of vehicle 10.

Step 106 comprises automatically modifying (or commanding a modification of or to) the amount of brake torque being applied to one or more wheels of the vehicle. In at least some implementations, this may comprise first decreasing and then subsequently increasing the amount of brake torque being applied; though other modifications are certainly possible. In an implementation wherein the brake torque is decreased and then increased, the decrease is intended to allow the vehicle to ride up and on top of the material that is built-up in front of the vehicle tyres/wheels as the vehicle decelerates to a stop, while the subsequent increase is intended to bring the vehicle to a standstill on top of the surface. In some implementations, the timing of the modification in step 106 is such that it occurs immediately before the vehicle comes to a standstill, for example, in the last revolution, or half revolution of the tyre (i.e., the vehicle only needs to travel a final very short distance (i.e. in the region of 30 cm or so) to ride up and on top of the built-up material); though in other implementations step 106 may be performed at a different point during the brake event.

In an embodiment, the modification(s) to the brake torque in step 106 may be made in accordance with an empirically-derived profile that is stored in or on a memory device that is part of or accessible by the component of vehicle 10 that is configured to perform or control the performance of step 106. The profile may dictate, for example, the amount by which to modify (i.e., increase/decrease) the brake torque, the rate which the brake torque is modified, and the duration of the modification to the brake torque. In certain implementations, the same profile may be utilized whenever method 100 is performed; in other embodiments, however, the profile that is used may be selected from a plurality of empirically-derived profiles or may be modified version of a single profile (e.g., using offsets). The selection of, or the modification to, a profile may be dependent upon a number of factors. Some factors, though certainly not the only ones, may include: the gradient of the terrain the vehicle is traversing, which may be determined from vehicle sensor(s) 14 (e.g., gradient sensor(s), gyro sensor(s), etc.); the loading of the vehicle (e.g., the number of passengers), which may be determined from vehicle sensor(s) 14 (e.g., vehicle occupancy sensor(s)); parameters or characteristics relating to the surface of the terrain being traversed (e.g., the coefficient of the surface friction), which may be determined as described elsewhere herein, and the like. Accordingly, in an embodiment wherein a profile may be selected from a plurality of profiles or a given profile may be modified, one or more relevant factors may be used with a data structure, for example, an empirically-derived look-up table stored in or on a memory that is part of or accessible by the component configured to perform step 106 to determine which profile to use or how to modify the given profile. Alternatively, the modification to the given profile may be determined using other suitable techniques (e.g., an algorithm that uses the relevant factor(s) as an input). In any instance wherein a profile is used as described above, the profile may be specific to the particular vehicle to account for vehicle attributes/characteristics such as, for example, vehicle size, tyre size, tyre pressure, etc.

The actual modification to the brake torque being applied may be implemented or effected in a number of ways, and the particular way may be dependent upon the arrangement of the vehicle and the brake subsystem thereof, in particular. For example, in an instance wherein the vehicle brake subsystem $12_2$ is a hydraulic-based system, the brake torque may be modified by modifying the pressure in the brake subsystem. So in an embodiment wherein the brake torque is to be modified by decreasing and then increasing the brake torque as described above, the amount of brake pressure in the vehicle may be decreased and then increased to carry out the modification. Particular ways in which pressure in a brake subsystem may be modified (decreased and/or increased) are well known in the art, and therefore, a detailed description thereof will not be provided. To summarize, however, in an illustrative embodiment, to increase brake pressure the brake subsystem is provided with a hydraulic pump which when activated pumps hydraulic fluid from a brake fluid reservoir into brake lines which are connected to hydraulic brake actuators, thereby increasing the hydraulic pressure therein and actuating the brakes to apply a brake torque that varies in accordance with the hydraulic pressure. To decrease the brake pressure the brake subsystem may be provided with a return conduit from the actuator (or any point downstream of the hydraulic pump) having a selectively operable valve therein which when opened selectively releases brake fluid from the pressurized part of the subsystem (downstream of the hydraulic pump) back into the brake fluid reservoir so as to reduce brake pressure.

In an embodiment, following the brake torque modification performed in step 106, method 100 may further include a step 108 of further modifying (increasing) the brake torque being applied so that the brake torque being applied substantially equals an expected or demanded brake torque (i.e., exactly equals or is within a predetermined tolerance (e.g., up to +/−5%)), which, in an embodiment, may be based on the position of the brake pedal of the vehicle when the vehicle has come to a stop. In such an embodiment, step 108 may comprise predicting/determining whether or not the vehicle has come to a standstill and if so, determining a demanded brake torque and then increasing (or commanding an increase to) the brake torque being applied to the wheel(s) of the vehicle such that the applied brake torque substantially equals the demanded brake torque (i.e., the applied brake torque may be blended into the demanded brake torque).

In an embodiment, a prediction as to whether the vehicle has come to a standstill may be made using, for example, readings from one or more of the vehicle sensors 14 (e.g., wheels speed sensor(s), vehicle speed sensor(s), etc.). Accordingly, in an embodiment, one or more electrical signals indicative of a value of the vehicle speed (or of a vehicle-related parameter that may be used to derive the vehicle speed) may be received from one or more sensors 14 and interpreted to determine the speed of the vehicle 10. If the speed is zero, then it can be predicted or determined that the vehicle has come to a standstill. In other embodiments, however, such as when vehicle speed below a certain value (e.g., the predetermined threshold speed described above) cannot be accurately measured, a profile or model that uses, for example, a last known vehicle speed (e.g., the threshold speed), the brake torque profile used in step 106, and/or one or more other factors (e.g., vehicle loading and surface-related characteristics) may be utilized to predict whether or not the vehicle has come to a standstill.

If it is determined/predicted that the vehicle has come to a standstill, step 108 may further include determining a demanded brake torque. The demanded brake torque may be determined in a number of ways. One way, though certainly not the only way, involves determining the brake pedal position from, for example, a brake pedal sensor, and then using the brake pedal position with an appropriately configured, empirically-derived data structure (e.g., look-up table) stored in or on a memory device that is part of or accessible by the component of the vehicle configured to perform step 108 to determine a demanded brake torque that corresponds to that particular brake pedal position. For example, the brake pedal position may be looked up in a look-up table that correlates brake pedal position with demanded brake torque, and a demanded brake torque may be determined.

Once the demanded brake torque is determined, step 108 includes modifying (or commanding a modification in or to) the brake torque being applied to wheel(s) of the vehicle such that the brake torque being applied substantially equals the demanded brake torque. Accordingly, in at least certain implementations, step 108 comprises increasing the brake torque being applied by an amount that is sufficient to bring the applied brake torque up to the demanded brake torque. The modification to the brake torque in step 108 may be performed in the same or similar manner as that described above with respect to step 106 which is incorporated here by reference.

In another embodiment, rather than modifying the applied brake torque in step 108 such that the applied brake torque is substantially equal to the demanded brake torque, step 108 may include maintaining the brake torque being applied at a value that is slightly above that at which the vehicle came to a standstill until the demanded brake torque falls below the automatically applied brake torque as a result of, for example, a change in the brake pedal position or otherwise.

It will be appreciated that while particular ways of performing steps 106, 108 have been provided, the present invention is not intended to be limited to any particular way(s) of doing so; rather, suitable ways other than that or those described above may be utilized instead. Additionally, the above described functionality of steps 106, 108 may be performed by any suitable means, for example, an electronic processor configured to access a memory device and execute instructions stored therein such that it is operable to perform the required functionality in whole or in part. In an embodiment, the electronic processor may comprise an electronic processor of brake subsystem 12$_2$ (e.g., ABS controller) or another suitable component of vehicle 10.

Once the automatically controlled brake torque or pressure and the and driver demanded brake torque or pressure are substantially equal the automated control of brake torque or pressure ends and brake torque or pressure thereafter is dependent upon driver demanded brake pressure, until such time as the vehicle is moving again, after which the method of the invention will restart once the entry conditions are met.

Figure 5:
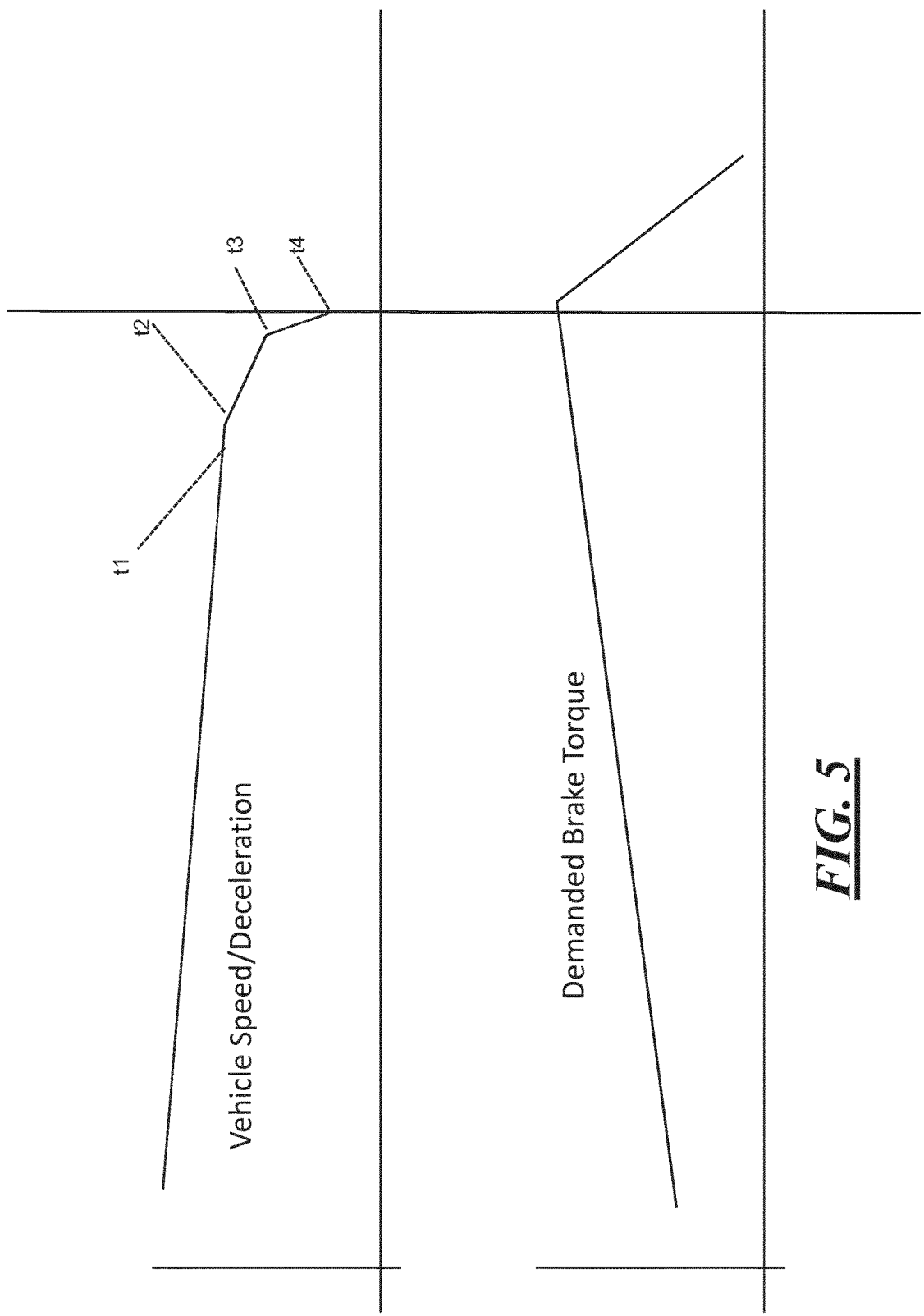
FIG. 5 is a graphical representation of an example of the deceleration of a vehicle and the demanded brake torque being applied to the wheels thereof as the vehicle traverses a low-mu deformable surface.
Figure 6:
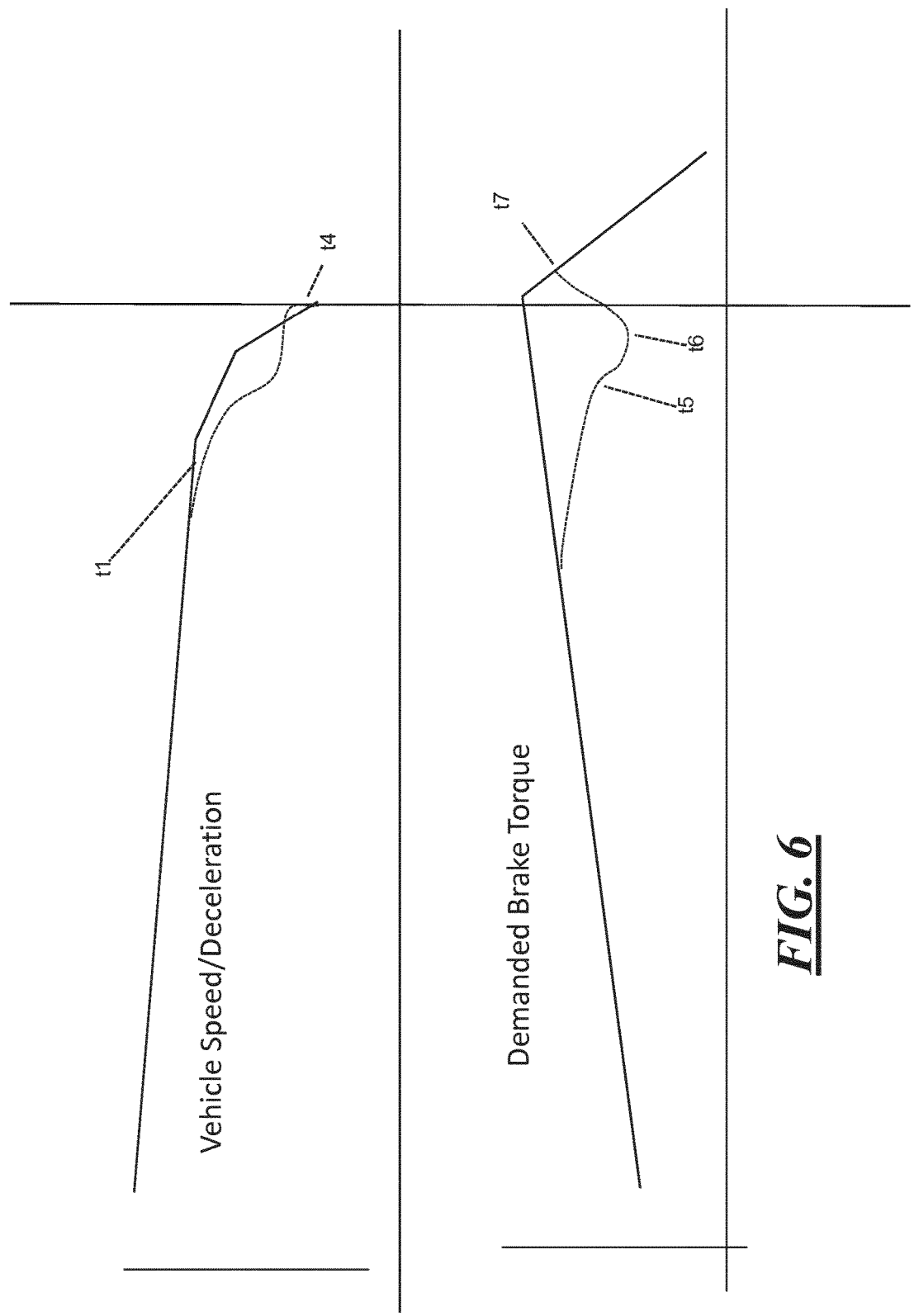
FIG. 6 is a graphical representation of another example of the deceleration of a vehicle and the demanded brake torque being applied to the wheels thereof as the vehicle traverses a low-mu deformable surface and an embodiment of the methodology depicted in one of FIGS. 4A-4D is performed.

To better illustrate the functionality of method 100, references is now made to FIGS. 5 and 6. FIG. 5 depicts an example of the deceleration of a vehicle whilst traversing a low-mu surface. More particularly, FIG. 5 includes a graphical representation showing the deceleration of the vehicle, and a graphical representation showing the demanded brake torque being applied that, in part, results in the depicted deceleration. At or around time t1 the vehicle speed reaches a point where penetration of the vehicle wheels into the surface of the terrain can no longer be prevented due to, for example, the vehicle speed, the vehicle weight, the tyre foot print, etc. Shortly thereafter at time t2, the vehicle wheels begin digging or sinking into the surface and the material forming the surface begins to build up in front of the vehicle wheels. As a result, the vehicle decelerates at a faster rate than that at which it was decelerated prior to time t1. As the wheels continue to dig/sink, the rate of deceleration continues to increase (e.g., between time t3 and t4). And the vehicle comes to a standstill at time t4.

As with FIG. 5, FIG. 6 depicts a non-limiting example of the deceleration of a vehicle that is traversing a low-mu surface, namely, sand, but that also employs method 100 described above. FIG. 6 includes a graphical representation showing the deceleration of the vehicle (with the actual vehicle speed shown in solid and then dashed lines), and a graphical representation showing the demanded brake torque being applied that, in part, results in the depicted deceleration (with the actual brake torque being shown in solid and then dashed lines). The brake torque is initially reduced to compensate for the sand drag applied to the wheels of the vehicle by the sand (as will be described in greater detail below). As the vehicle speed reaches a predetermined speed at time t5 (step 104) (which is later in time than time t2 but earlier than time t3) the brake torque being applied to the wheels of the vehicle is temporarily decreased to enable the wheels to ride up and onto the top of the sand that has built-up in front of the wheels. As shown, at time t6 (which, in this example, is after time t2, t3, and t5 but before time t4), the brake torque is subsequently increased to bring the vehicle to a stop at time t4 (step 106). The brake torque is then subsequently increased between time t4 and t7 to blend the brake torque being applied into that demanded by, for example, the driver of the vehicle (demanded brake torque) (step 108).

Figure 4B:
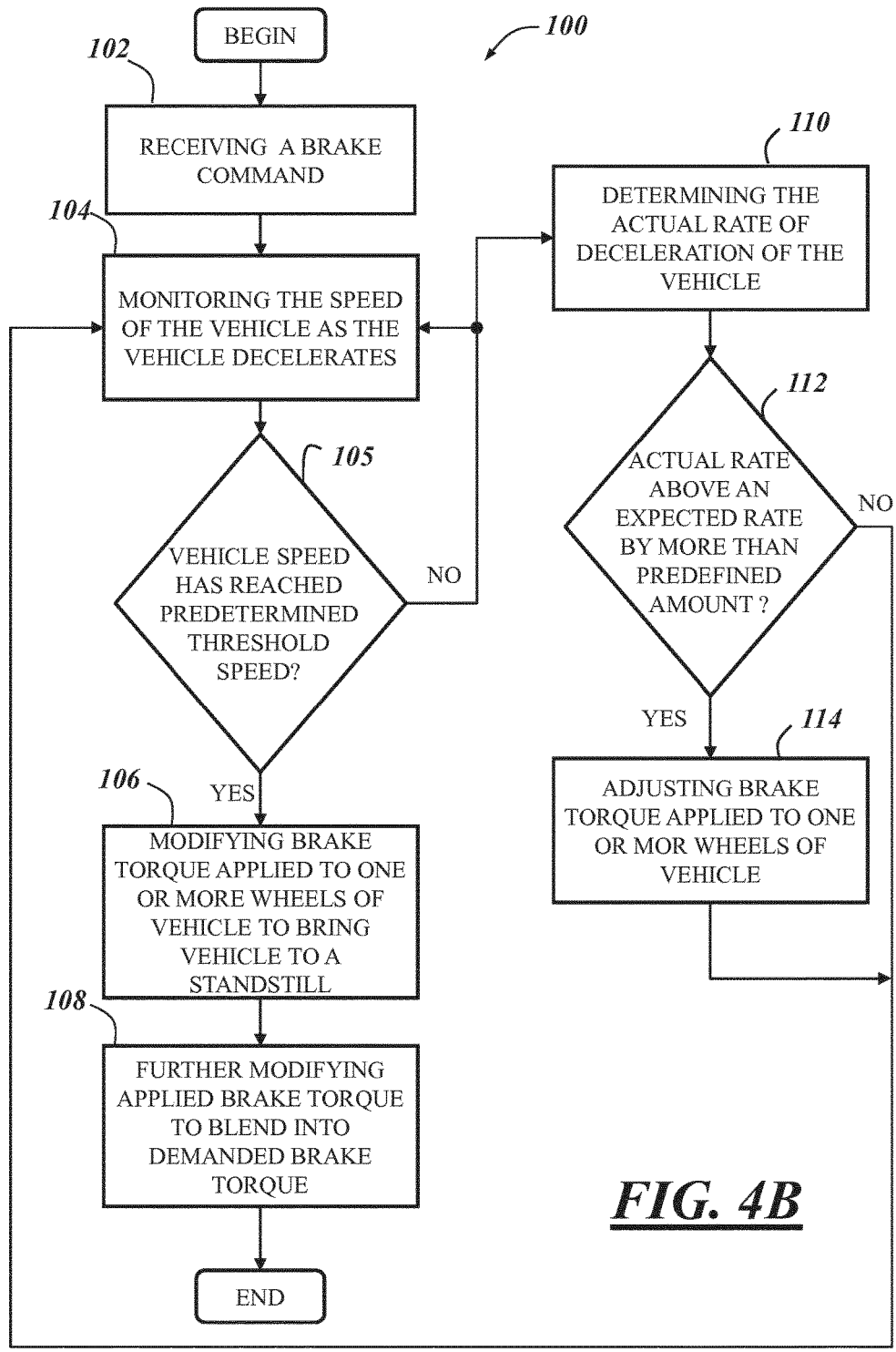

In addition to the steps described above, method 100 may further include one or more additional steps, some or all of which may be optional. For example, prior to the modification of the brake torque in step 106, method 100 may include a series of steps intended to counter or substantially cancel out the deceleration of the vehicle caused by drag torque being applied to one or more wheels of the vehicle as the wheel(s) dig/sink into the surface of the terrain. More particularly, and as illustrated in FIG. 4B, following one or more of steps 102, 104, and/or 105 (in the illustrated embodiment, this functionality is performed following step 105 but may alternatively be performed following one or both of steps 102, 104 and before step 105)), but before the vehicle reaches the predetermined speed and therefore the triggering of step 106, method 100 may include a step 110 of determining an actual rate of deceleration of the vehicle. The rate of deceleration may be determined in any number of ways known in the art. One way is by receiving an electrical signal indicative of a value of the rate of deceleration from one of the subsystems 12 of the vehicle 10 (e.g., powertrain subsystem $12_1$, brake subsystem $12_2$, etc.). In such an embodiment, the subsystem may be configured to determine or calculate the rate of deceleration and then generate an electrical signal indicative of a value of the determined or calculated rate. Another way in which the actual rate of deceleration may be determined is by receiving one or more electrical signal(s) from one or more sensor(s) 14 of vehicle that is/are indicative of a value of the actual rate of deceleration, or value(s) one or more vehicle-related parameters (e.g., vehicle speed) that may be used to derive or calculate the actual rate of deceleration using known techniques. The sensor(s) may include, for example and without limitation, wheel speed sensor(s), vehicle speed sensor(s), and/or longitudinal acceleration sensor(s). Accordingly, it will be appreciated in view of the foregoing that the present invention is not intended to be limited to any one particular technique for determining the actual rate of deceleration in step 110.

In any event, in an instance wherein one or more electrical signals are received, the electrical signal(s) may be interpreted or processed either alone or in conjunction with one or more other signals (or the values the electrical signals are indicative of) or previously acquired values of a particular parameter in order to determine the actual deceleration of the vehicle. Additionally, the electrical signal(s) may received directly from the pertinent subsystem(s) or sensor(s), as appropriate, or indirectly therefrom via, for example, a CAN bus, SMBus, proprietary communication link, or in some other suitable manner.

The above described functionality of step 110 may be performed by any suitable means, for example, an electronic processor that includes one or more electrical inputs for receiving electrical signals, including, for example, those described above, and that is configured to access a memory device and execute the instructions stored therein such that it is operable to perform the required functionality (i.e., determining (e.g., calculating or deriving) the actual rate of deceleration). In an embodiment, the electronic processor may comprise an electronic processor of brake subsystem $12_2$ (e.g., ABS controller) or another suitable component of vehicle 10.

Following the determination of the actual rate of deceleration in step 110, method 100 may further include a step 112 of comparing the actual rate of deceleration with an expected rate of deceleration corresponding to, for example, the brake command received in step 102. Accordingly, in an embodiment, step 112 may comprise using the received brake command to determine an expected rate of deceleration, and then comparing that expected rate of deceleration with the actual rate of deceleration determined in step 110. For instance, in an embodiment wherein step 102 comprises receiving an electrical signal indicative of a demanded brake torque or brake pressure, the value of the demanded brake torque or brake pressure may be used with an appropriately configured data structure (e.g., look-up table) to determine an expected rate of deceleration that corresponds to that particular demanded brake torque or pressure. For example, the brake torque or pressure value may be looked up in a look-up table that correlates demanded brake torque or pressure with expected rate of deceleration, and an expected rate of deceleration may be determined. It will be appreciated that while one particular way to determine an expected rate of deceleration has been provided, the present invention is not intended to be limited to any one particular way or technique for doing so; rather, suitable ways or techniques other than that described above may be utilized instead.

Once the expected rate of deceleration is determined, it may be compared with the actual rate of deceleration determined in step 110, and a determination as to whether the actual rate is above (i.e., exceeds) or is below the expected rate may be made. One reason why the actual rate may exceed the expected rate, and thus, the is vehicle decelerating faster than it normally would in response to a given brake command, is that as the vehicle 10 decelerates in response to a brake command received in step 102, one or more of the vehicle wheels may dig/sink into the surface of the terrain the vehicle is traversing. As the wheel(s) dig/sink, a drag torque is applied to the wheels by the surface material into which the wheel(s) dig/sink that has a decelerating effect on the vehicle. The deceleration caused by the drag torque is additive to the deceleration resulting from the brake command, and therefore, increases the rate at which the vehicle decelerates. As such, the actual rate of deceleration exceeds the expected rate of deceleration that corresponds to the brake command. In any event, if it is determined in step 112 that the actual rate is below the expected rate (or, in certain embodiments, is below, meets, or is within a predefined tolerance above the expected rate, for example is within a tolerance having a value in the range of 0 to 10% above the expected rate), method 100 may loop back to a previous step in the methodology (e.g., step 102, 104 (as shown in FIG. 4B), or) until either the speed of the vehicle has fallen below the predetermined threshold used in step 105, the driver ends the braking event (e.g., by removing his foot from the brake pedal), or it is determined in step 112 that the actual rate of deceleration is sufficiently above the expected rate. Conversely, if it is determined that the actual rate is above the expected rate (or, in certain embodiments, meets or is above the expected rate by at least a predefined amount), method 100 may proceed to a step 114 described below.

The above described functionality of step 112 may be performed by any suitable means, for example, an electronic processor that includes one or more electrical inputs for receiving electrical signals, including, for example, those described above, and that is configured to access a memory device and execute the instructions stored therein such that it is operable to perform the required functionality (i.e., determining an expected rate of deceleration and comparing it with the actual rate of deceleration determined in step 110). In an embodiment, the electronic processor may comprise an electronic processor of brake subsystem $12_2$ (e.g., ABS controller) or another suitable component of vehicle 10.

As briefly described above, if it is determined in step 112 that the actual rate of deceleration is above an expected rate by more than a predefined amount, which may be zero (meaning that the actual and expected rates are equal) or may be a tolerance band, for example it may have a value in the range of 0 to 10% above the expected rate (e.g., the actual rate is equal to or at least a certain percentage above the expected rate), method 100 may move to step 114. Step 114 comprises adjusting or reducing (or commanding a reduction in) the amount of brake torque being applied to one or more wheels of the vehicle to account for the difference between the actual and expected rates of deceleration. In other words, the brake torque applied by the vehicle braking subsystem $12_2$ is reduced or backed off to (at least substantially) cancel out the deceleration caused by the drag torque being applied to the vehicle wheels by the surface into which the vehicle wheels are digging/sinking.

The amount by which the brake torque is reduced may be dependent upon any number of factors, and may be determined using an empirically-derived profile or model or an algorithm that takes into account one or more of these factors and that may be programmed into a memory device of a suitable vehicle component during manufacture of the vehicle 10 or at another time. Some factors that may be utilized include, but are certainly not limited to, the magnitude of the difference between the actual and expected rates of deceleration, vehicle weight, and the size and pressure of the vehicle tyres. In other embodiments, one or more data structures may be used to determine the amount by which the brake torque is reduced. For example, the magnitude of the difference between the actual and expected rates of deceleration may be determined and then looked up in a look-up table that correlates the difference between actual and expected rates of deceleration with magnitudes of brake torque reduction, and an amount by which the reduce the brake torque being applied may be determined. In yet other embodiments, control systems such as closed-loop control systems may be utilized. Regardless of the particular manner in which the amount by which the brake torque is to be reduced is determined, in an embodiment, step 108 comprises reducing the amount of brake torque by an amount sufficient to decelerate the vehicle in accordance with the expected rate of deceleration, which in one embodiment means decelerating the vehicle at expected rate of deceleration, and in another embodiment means decelerating the vehicle at or within a predefined tolerance, for example a tolerance in the range of 0% to +/−10% of the expected rate of deceleration.

The actual reduction in brake torque may be implemented or effected in a number of ways, including, but not limited to, that described above with respect to step 106 which is incorporated here by reference, as well as using other technique(s) known in the art.

As with other steps of method 100, the above described functionality of step 114 may be performed by any suitable means, for example, an electronic processor configured to access a memory device and execute the instructions stored therein such that it is operable to perform the required functionality in whole or in part. In an embodiment, the electronic processor may comprise an electronic processor of brake subsystem $12_2$ (e.g., ABS controller) or another suitable component of vehicle 10.

While one particular way in which the amount brake torque being applied to one or more wheels of the vehicle is modified (reduced) to account for the drag torque applied to the wheels by the surface has been described above and illustrated in FIG. 4B (e.g., steps 110-114), the present disclosure is not intended to be limited to such any particular way(s); rather, any number of other ways may be utilized instead. For example, in another embodiment or implementation, the brake torque may be modified by a variable amount based on, for example, the vehicle speed, the grade of the terrain, the amount of demanded brake torque, and/or other relevant factors. In such an embodiment, the amount by which the brake torque is modified may be determined using an appropriately configured, empirically-derived data structure (e.g., look-up table). For example, values of one or more of the above identified-parameters may be looked up in a look-up table that correlates that or those parameters with brake torque reduction, and an amount by which to reduce the brake torque may be determined. In any event, it will be appreciated that in at least certain implementations, there may be a maximum brake torque reduction that will be allowable such that the brake torque is not reduced by more than the magnitude of the drag torque being applied to the wheels.

In some embodiments or implementations, method 100 may include one or more additional or alternative steps, at least some of which may be used to determine whether one or more steps of method 100 should be performed.

Figure 4C:
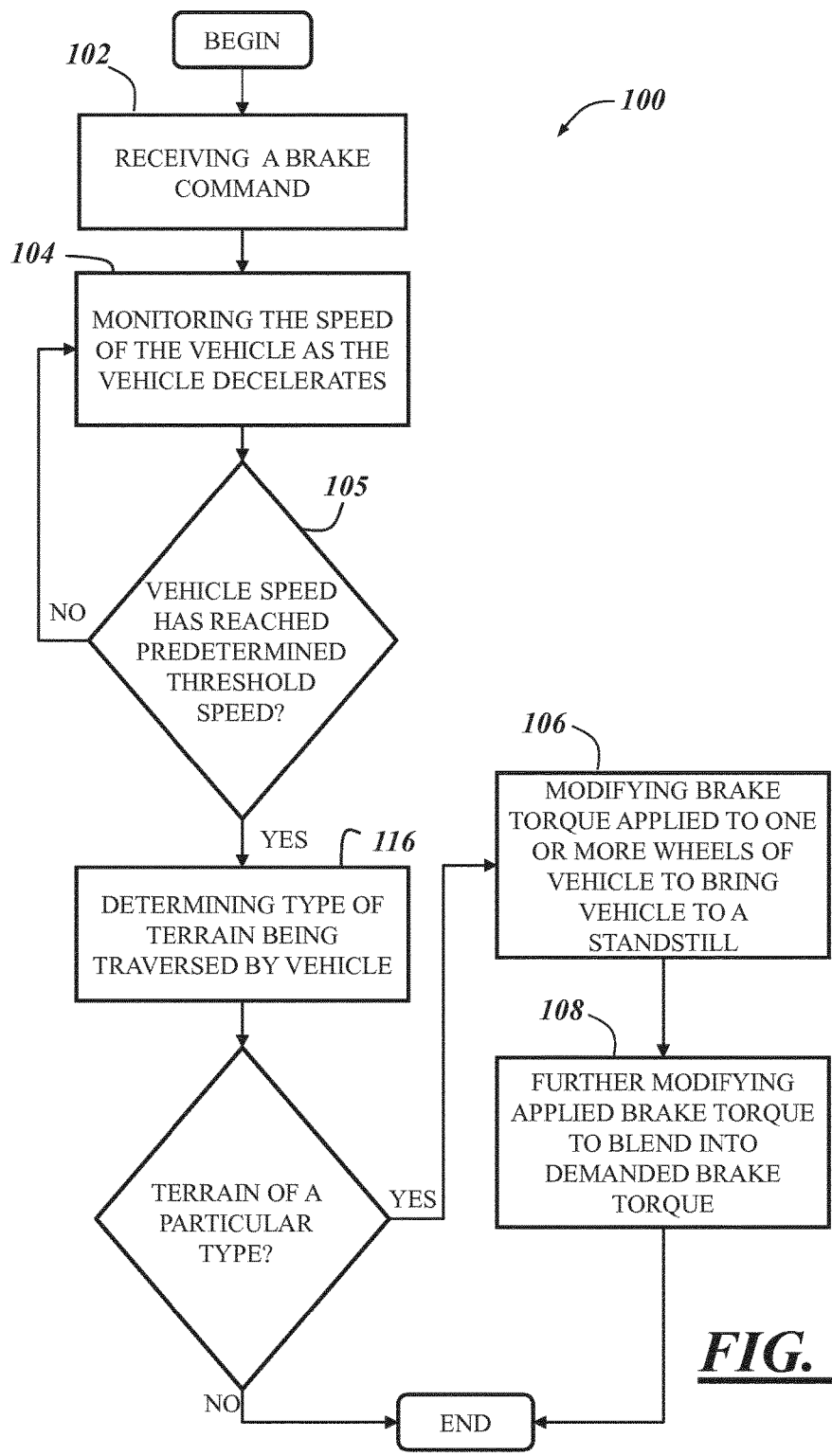

As illustrated in FIG. 4C, one such step, step 116, comprises determining the type of terrain the vehicle is traversing and then determining whether the prevailing terrain is one deemed to be well-suited for the functionality of method 100. In an embodiment wherein method 100 includes step 116, method 100 may comprise performing one or more of the above-described steps (e.g., steps 102, 104, 105, 106, 110 (if applicable), etc.) only if the terrain determined in step 116 is one of one or more particular types of terrain, for example, sand. Accordingly, in an embodiment, step 116 may first comprise determining the type of terrain that the vehicle is traversing, and this determination may be made in a number of ways. For example, in an embodiment, the terrain type may be determined automatically in the manner described in detail above with respect to LSP control system 28. For example, information relating to a variety of different vehicle-related parameters may be acquired from a plurality of vehicle sensors (e.g., sensors 14) and/or various vehicle subsystems (e.g., subsystems 12). The acquired information may then be evaluated and used to determine the terrain type. An additional or alternative way the terrain type may be determined is in response to a user input representative of a particular terrain type. A vehicle occupant may provide this input using a suitably configured user interface device, for example, a user interface device of the speed control system (e.g., one of user input devices 44 of LSP control system 28 described above and illustrated in FIG. 3), or another user interface device located within the vehicle cabin, for example, a knob, switch, pushbutton, touch screen display, or other suitable device that allows for the selection of a terrain type from one or a plurality of different terrain types. Accordingly, it will be appreciated that any number of techniques may be used to determine a terrain type, and therefore, the present invention is not intended to be limited to any particular technique(s) for doing so. In an instance wherein the terrain type is determined by a component or subsystem of vehicle 10 that is different than that configured to perform other steps of method 100, the determination may be communicated to that other component.

Once the prevailing terrain type has been determined, it may be compared with one or more particular terrain types stored in, for example, a data structure (e.g., look-up table). If the prevailing terrain type does, in fact, match one of the predefined terrain types, then it may be determined in step 116 that method 100 may proceed to a subsequent step, for example and as illustrated in FIG. 4C, step 106; otherwise, it may be determined that a subsequent step should not be performed and method 100 may return to, for example, step 102 or terminate altogether. The functionality described herein may be particularly suited for any number of terrain types, and therefore, the predefined terrain types to which the prevailing terrain type is compared may include any number of different terrain types. In an embodiment, these terrain types may include, for example, those having a deformable, low-mu surface, for example and without limitation, sand, mud, gravel, and wet grass. In one specific embodiment, method 100 may only be performed if it is determined that the vehicle is driving on sand, and optionally that it is driving on a particular type of sand, for example dry sand, which may be determined by the coefficient of surface friction of the terrain. While in the embodiment described above step 106 is performed only if certain criteria are met, in other embodiments step 116 may be performed prior to any one of the other steps of method 100 described above (e.g., any of steps 102, 104, 105, 110, 112, or 114), and that or those steps may be performed only if prevailing terrain type does, in fact, match one of the predefined terrain types. Accordingly, the present disclosure is not limited to step 116 being performed in any particular sequence relative to the other steps of method 100.

In an embodiment, the functionality of step 116 described above may be performed by one or a combination of components/subsystems of vehicle 10, for example, a combination of LSP control system 28 and brake subsystem 12₂ (e.g., the electronic controller(s) thereof) or one or more other suitable component(s) of vehicle 10.

Figure 4D:
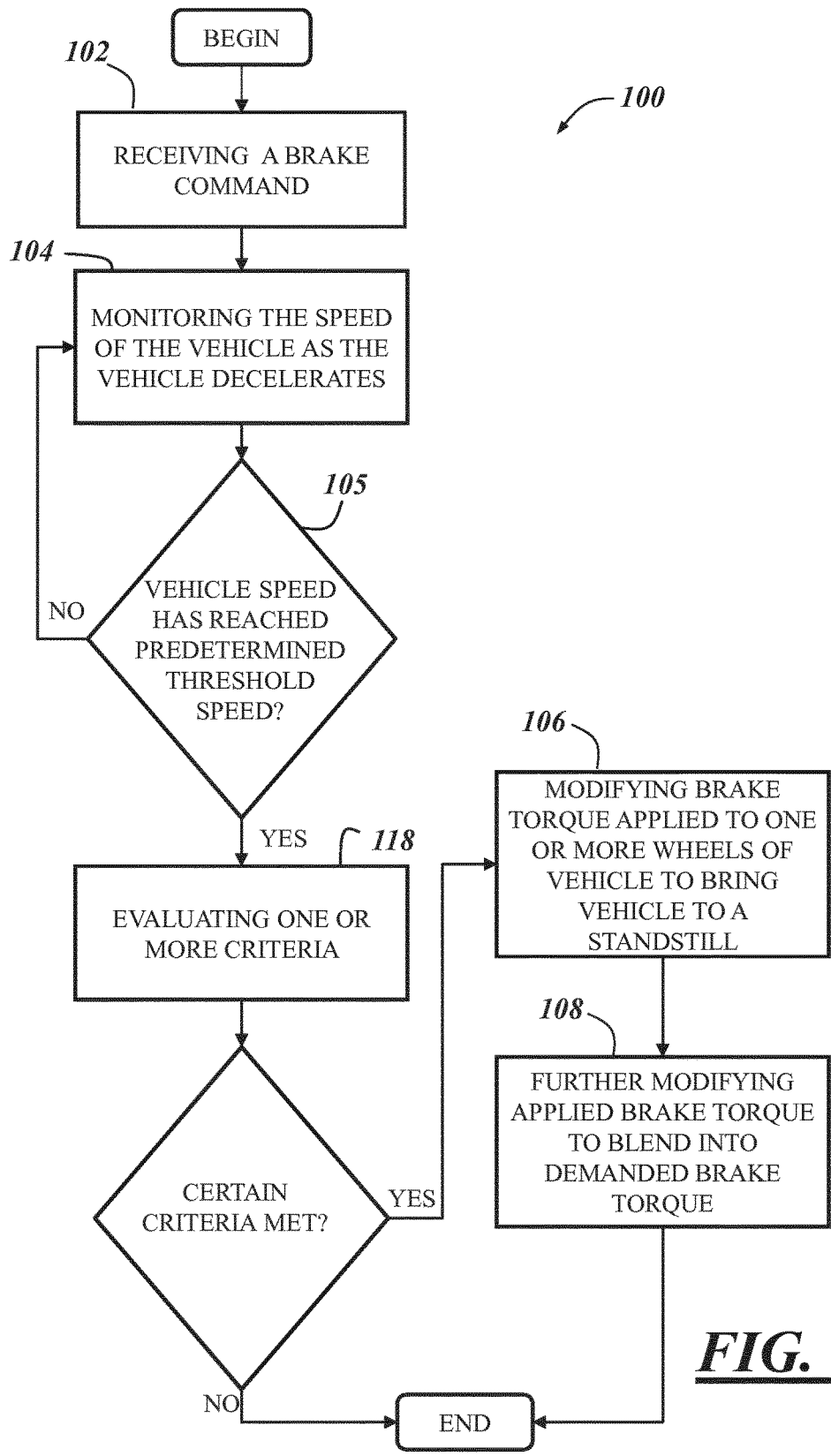

Similar to step 116, and as shown in the embodiment illustrated in FIG. 4D, method 100 may additionally or alternatively include a step 118 of evaluating one or more criteria to determine whether to perform one or more steps of method 100, for example and without limitation, step(s) 106 and/or 114. Any number of criteria may be evaluated in step 118 including but certainly not limited one or more of those described herein.

For example, in some implementations, it may desirable to perform some or all of the steps of method 100 (e.g., steps 110-114) only at relatively low vehicle speeds. Accordingly, one criterion may be that the speed of the vehicle is below (or has fallen below) a predefined threshold value. In an embodiment wherein such a criterion is to be evaluated, one or more electrical signals indicative of a value of the vehicle speed may be received and interpreted to determine the speed of the vehicle 10. This value may then be compared to a predefined threshold, which may be, for example and without limitation, a value between 0-20 kph (i.e., about 0-12 mph), and in an illustrative embodiment, between 5-15 kph (i.e., about 3-9 mph). The threshold value may be an empirically-derived value that is programmed into a memory device of a suitable vehicle component, and may be either the same threshold as that used in step 105 or a different, higher threshold speed. If the vehicle speed is below the threshold, a determination can be made that this criterion is met; otherwise it can be determined that it is not.

Another criterion that may be evaluated relates to the gradient of the terrain the vehicle is traversing. More particularly, in some implementations, it may be desirable to perform some or all of the steps of method 100 only when the gradient or incline of the terrain is not, relatively speaking, too severe. Accordingly, one criterion may be that the gradient of the terrain is below a predefined threshold. In an embodiment wherein such a criterion is to be evaluated, one or more signals indicative of either the gradient of the terrain, or one or more vehicle-related parameters that may be used to derive the gradient of the terrain, may be received from one or more vehicle sensors 14 (e.g., gyro sensor(s), gradient sensor(s), etc.) or another component of vehicle 10 (e.g., a subsystem 12), and may be interpreted to determine the gradient of the terrain. The gradient may then be compared to the predefined threshold, which may be for example and without limitation, a value between 0-10%, and in an embodiment, around 5%. The threshold may be an empirically-derived value that is programmed into a memory device of a suitable vehicle component. If, as described above, the gradient is below (or, in an embodiment, meets or is below) the threshold, a determination can be made that this criterion is met; otherwise it can be determined that it is not.

Yet another possible criterion relates to the state of the anti-lock brake system (ABS) of vehicle 10. More particularly, one criterion may be that the ABS of the vehicle 10 is in a deactivated state meaning that it is not actively controlling or contributing to the braking of the vehicle. Accordingly, in an embodiment, a determination can be made as to whether the ABS is active, and if not, a determination can be made that this criterion is met. Otherwise, it can be determined that the criterion is not met.

Yet still another criterion that may be considered relates to the particular amount of brake torque being applied to one or more wheels of the vehicle 10, or the amount of brake pressure in the brake subsystem 12₂, and particularly, that the applied brake torque or pressure is less than a predefined amount. Accordingly, in an embodiment, one or more signals indicative of the brake torque being applied to one or more wheels of the vehicle 10, the brake pressure in the brake subsystem 12₂, or one or more vehicle-related parameters that may be used to derive the amount of brake torque and/or brake pressure may be received from one or more vehicle sensors 14 or another component of vehicle 10 (e.g., a subsystem 12). The received signal(s) may be interpreted to determine amount of applied brake torque or brake pressure, and then the determined amount may be compared to the predefined threshold, which may be an empirically-derived value that is programmed into a memory device of a suitable vehicle component. If, as described above, the brake torque or pressure is less than (or, in an embodiment, less than or equal to) the threshold, a determination can be made that this criterion is met; otherwise it may be determined that it is not.

A further criterion that may be evaluated relates to the displacement of the brake pedal of the vehicle 10, and particularly, the brake pedal displacement being less than a predefined amount. Accordingly, in an embodiment, one or more signals indicative of the brake pedal displacement or one or more vehicle-related parameters that may be used to derive the displacement may be received from one or more vehicle sensors 14 (e.g., a brake pedal sensor) or another component of vehicle 10 (e.g., a subsystem 12), and may be interpreted to determine the brake pedal displacement. The determined displacement may then be compared to the predefined threshold, which may be an empirically-derived value that is programmed into a memory device of a suitable vehicle. If, as described above, the displacement is below (or, in an embodiment, meets or is below) the threshold, a determination can be made that this criterion is met.

In an embodiment, as illustrated in FIG. 4D wherein method 100 includes step 118, and depending on the particular implementation of method 100, certain steps of method 100 (e.g., steps 106, 114, etc.) may be performed only if at least a certain number (e.g., all or less than all) or certain one(s) of the evaluated criteria are met or satisfied. Accordingly, in an instance wherein the appropriate criteria or number of criteria is/are met, method 100 may proceed to a subsequent step (e.g., step 106, 114, etc.); otherwise, method 100 may loop back to a previous step, or may simply terminate.

The above described functionality of step 118 may be performed by any suitable means, for example, an electronic processor configured to access a memory device and execute the instructions stored therein such that it is operable to perform the required functionality in whole or in part. In an embodiment, the electronic processor may comprise an electronic processor of brake subsystem 12$_2$ (e.g., ABS controller) or another suitable component of vehicle 10.

It will be appreciated in view of the above that a benefit or advantage of at least some embodiments of the present invention, among potentially others, is that when a vehicle traversing a deformable, low-mu surface (e.g., sand, gravel, wet grass, or mud) is being decelerated to a stop, brake torque applied to one or more wheels of the vehicle is automatically reduced to account for and counter the decelerating effect a drag torque applied to the vehicle wheels by the low-mu surface that has on the vehicle. This at least limits the depth to which the vehicle wheels sink or dig into the surface of the terrain, and therefore, results in the vehicle decelerating and coming to a stop in a more composed and expected manner than if the brake torque was not adjusted. It may further eliminate (or at least limit) the amount of material that is built up in front of the wheels as the vehicle comes to a stop; and may also allow for the wheels of the vehicle to roll over the built-up material at the end of the stop before coming to a standstill on top of the surface. As a result, it may be easier for the vehicle to subsequently pull away in a composed and expected manner.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method of managing the deceleration of a vehicle, comprising:
   receiving a brake command;
   monitoring the speed of the vehicle as the vehicle decelerates in response to the brake command;
   determining a terrain indicator indicative of a characteristic of the terrain; and
   when the vehicle speed reaches a predetermined threshold, automatically modifying the amount of brake torque being applied to one or more wheels of the vehicle based on the characteristic of the terrain by first decreasing the amount of brake torque being applied and then subsequently increasing the amount of brake torque being applied to bring the vehicle to a standstill.

2. The method of claim 1, wherein receiving a brake command comprises receiving an electrical signal indicative of a driver-demanded brake torque.

3. The method of claim 1, wherein modifying the amount of brake torque being applied comprises decreasing and then increasing the amount of brake pressure in the brake system of the vehicle.

4. The method of claim 1, further comprising:
   evaluating one or more criteria to determine whether to modify the brake torque being applied to one or more wheels of the vehicle; and
   modifying the brake torque being applied to one or more wheels of the vehicle when at least one of the one or more criteria are met.

5. The method of claim 1, further comprising:
   predicting that the vehicle has come to a standstill; and
   further increasing the brake torque being applied to one or more wheels of the vehicle to a demanded brake torque.

6. The method of claim 1, wherein after the brake command is received but before the vehicle speed reaches the predetermined threshold, the method further comprises:
   determining an actual rate of deceleration of the vehicle;
   comparing the actual rate of deceleration with an expected rate of deceleration corresponding to the received brake command; and
   when the actual rate of deceleration exceeds the expected rate by more than a predefined amount, reducing the amount of brake torque being applied to one or more wheels of the vehicle so that the rate at which the vehicle decelerates is reduced to account for the difference between the actual and expected rates of deceleration.

7. The method of claim 6, wherein reducing the amount of brake torque comprises reducing the amount of brake pressure in the brake system of the vehicle.

8. The method of claim 6, wherein reducing the amount of brake torque applied to one or more wheels of the vehicle comprises reducing the amount of brake torque being applied to one or more wheels of the vehicle by an amount sufficient to decelerate the vehicle in accordance with the expected rate of deceleration.

9. The method of claim 1, further comprising:
determining the type of terrain the vehicle is traversing based on the characteristic of the terrain; and
modifying the brake torque applied to one or more wheels of the vehicle only when the terrain is one of one or more particular terrain types.

10. The method of claim 9, wherein determining the terrain type comprises one of receiving a user input indicative of a terrain type and automatically determining the terrain type.

11. The method of claim 9, wherein the one or more particular terrain types correspond to terrains having a deformable surface.

12. A non-transitory, computer-readable storage medium storing instructions thereon that when executed by one or more electronic processors causes the one or more electronic processors to carry out the method of claim 1.

13. A system for managing the deceleration of a vehicle, the system comprising:
an electronic processor having an electrical input for receiving a brake command; and
an electronic memory device electrically coupled to the electronic processor and having instructions stored therein,
wherein the processor is configured to access the memory device and execute the instructions stored therein such that it is configured to:
monitor the speed of the vehicle as the vehicle decelerates in response to the brake command;
determine a terrain indicator indicative of a characteristic of the terrain; and
when the speed of the vehicle reaches a predetermined threshold, automatically command the modification of the amount of brake torque being applied to one or more wheels of the vehicle based on the characteristic of the terrain by first commanding a decrease in the amount of brake torque being applied and then subsequently commanding an increase in the amount of brake torque being applied to bring the vehicle to a standstill.

14. The system of claim 13, wherein commanding the modification to the amount of brake torque being applied comprises commanding a decrease and then an increase in the amount of brake pressure in the brake system of the vehicle.

15. The system of claim 13, wherein the processor is further operable to:
evaluate one or more criteria to determine whether to modify the brake torque being applied to one or more wheels of the vehicle; and
command the modification to the amount of brake torque being applied to one or more wheels of the vehicle when at least one of the one or more criteria are met.

16. The system of claim 13, wherein the processor is further operable to:
predict that the vehicle has come to a standstill; and
command an increase in the brake torque being applied to one or more wheels of the vehicle to a demanded brake torque.

17. The system of claim 13, wherein after the brake command is received but before the vehicle speed reaches the predetermined threshold, the processor is operable to:
determine an actual rate of deceleration of the vehicle;
compare the actual rate of deceleration of the vehicle with an expected rate of deceleration corresponding to the received brake command;
and whether the actual rate of deceleration exceeds the expected rate by more than a predefined amount, command a reduction in the amount of brake torque being applied to one or more wheels of the vehicle so that the rate at which the vehicle decelerates is reduced to account for the difference between the actual and expected rates of deceleration.

18. The system of claim 13, wherein the processor is operable to:
determine the type of terrain the vehicle is traversing based on the characteristic of the terrain; and
command the modification to the amount of brake torque being applied to one or more wheels of the vehicle only when the terrain is one of one or more particular terrain types.

19. An electronic controller for a vehicle having a storage medium associated therewith storing instructions that when executed by the controller causes the management of the deceleration of the vehicle in accordance with the method of:
receiving a brake command;
monitoring the speed of the vehicle as the vehicle decelerates in response to the brake command;
determining a terrain indicator indicative of a characteristic of the terrain; and
when the vehicle speed reaches a predetermined threshold, automatically modifying the amount of brake torque being applied to one or more wheels of the vehicle based on the characteristic of the terrain by first decreasing the amount of brake torque being applied and then subsequently increasing the amount of brake torque being applied to bring the vehicle to a standstill.

* * * * *